United States Patent [19]

Weyer

[11] Patent Number: 4,882,979

[45] Date of Patent: Nov. 28, 1989

[54] DUAL-PISTON ACUATOR

[76] Inventor: Paul P. Weyer, 48811-284th Avenue S. E., Enumclaw, Wash. 98022

[21] Appl. No.: 255,067

[22] Filed: Oct. 7, 1988

[51] Int. Cl.[4] ........................ F01B 7/16; F16H 55/02; F16K 31/124; F16K 31/53

[52] U.S. Cl. ........................................ 92/33; 91/533; 74/89; 251/31; 251/58; 251/62; 251/229

[58] Field of Search ................. 91/533; 92/31, 32, 33, 92/113, 116, 178; 74/25, 89, 89.15; 251/31, 58, 62, 229

[56] References Cited

U.S. PATENT DOCUMENTS

| | | | |
|---|---|---|---|
| 2,932,206 | 4/1960 | Tootle | 92/33 |
| 2,936,737 | 5/1960 | Miller | 92/31 |
| 2,955,579 | 10/1960 | Block | 92/33 |
| 2,970,574 | 2/1961 | Geyer | 92/33 |
| 3,187,592 | 6/1965 | Geyer | 74/89 |
| 3,499,342 | 3/1970 | Ligh | 92/33 |
| 3,508,472 | 4/1970 | Hartwick, Jr. | 92/33 |
| 4,196,654 | 4/1980 | Stearns | 92/33 |
| 4,603,616 | 8/1986 | Zajac | 92/33 |

OTHER PUBLICATIONS

Carter Helical Rod Series. Carter Controls, Inc. Bulletin RA-500E (Applicant admits this reference is prior art.)

*Primary Examiner*—George L. Walton
*Attorney, Agent, or Firm*—Seed and Berry

[57] ABSTRACT

A fluid-powered actuator having a body with first and second end walls, with a bulkhead positioned therebetween, which is adjustably rotatable to angularly position the bulkhead relative to the body for fluid-powered operation to establish the end limits of rotation of an output shaft. The actuator has first and second piston heads disposed in the body on opposite sides of the bulkhead to define four fluid-tight chambers. In the preferred embodiment, the bulkhead is selectively clamped between two sidewall portions. A sleeve extends between and fixedly connects the piston heads together. A plurality of guide rods are fixedly attached to and extend between the piston heads and through apertures in the bulkhead in one embodiment, and between the first piston head and the bulkhead and through apertures in the first piston head in another embodiment to transmit torque to the body and through the bulkhead. An alternative embodiment has an eccentric piston sleeve projecting through a correspondingly sized and shaped aperture in the bulkhead to transmit torque. Seals are provided to prevent fluid leakage between the four fluid-tight chambers.

39 Claims, 7 Drawing Sheets

FIG. 1
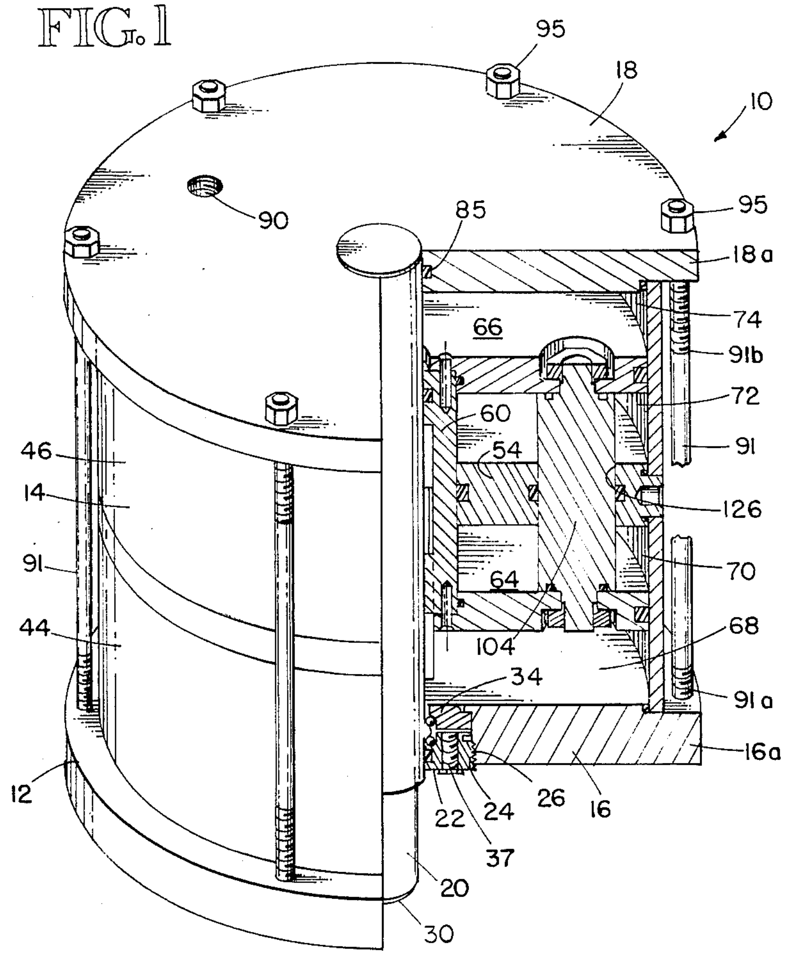
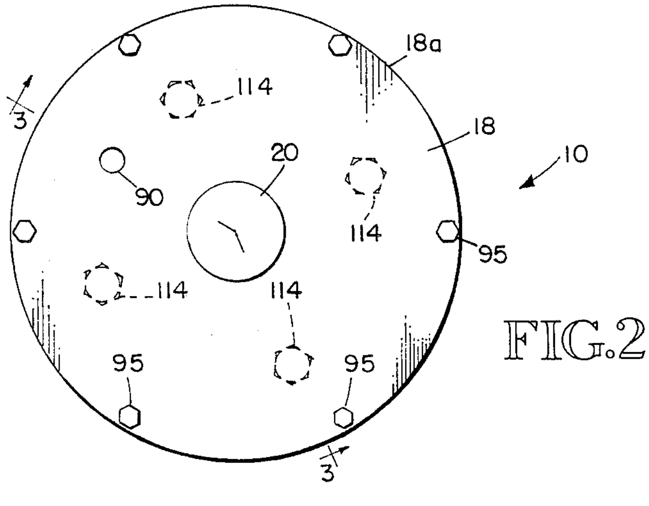
FIG. 2

FIG. 8
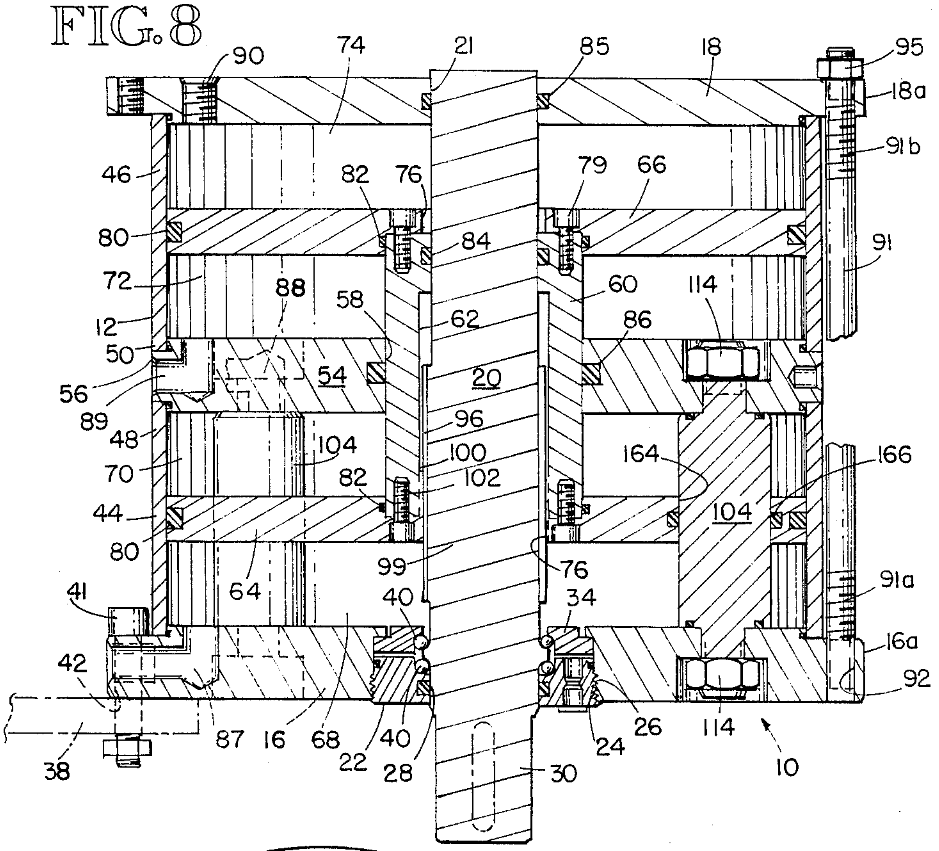
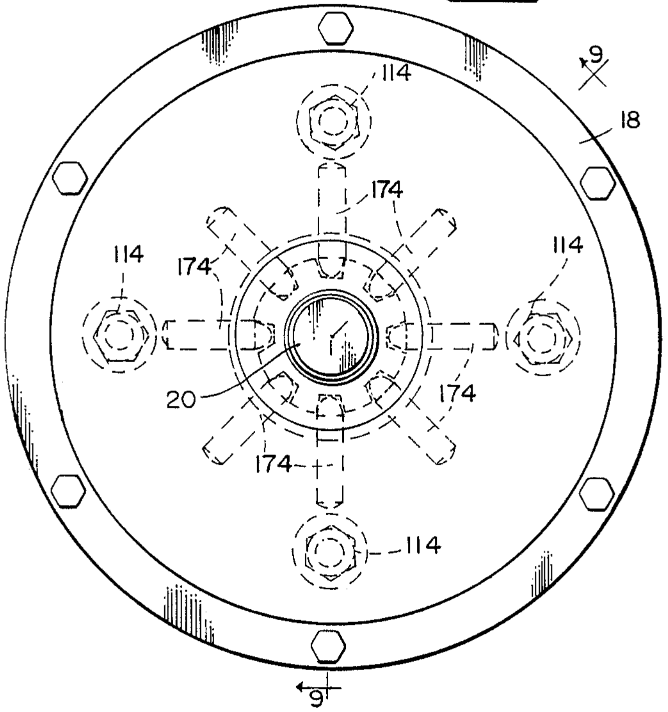
FIG. 10

DUAL-PISTON ACUATOR

DESCRIPTION

1. Technical Field

The present invention relates generally to actuators, and more particularly, to fluid-powered actuators of the type in which axial movement of a piston produces relative movement between a body and an output shaft.

2. Background of the Invention

Rotary helical-splined actuators have been employed in the past to achieve the advantage of high-torque output from a simple linear piston-and-cylinder drive arrangement. The actuator typically uses a cylindrical body with an elongated rotary output shaft extending coaxially within the body, with an end portion of the shaft providing the drive output. An elongated piston sleeve is disposed between the body and the shaft and coaxially receives the shaft therein. The piston sleeve has a sleeve portion helically splined to cooperate with corresponding splines on the body interior and the output shaft exterior. The piston sleeve is reciprocally mounted within the body and has a head defining a fluid-tight chamber to each axial side thereof for the application of fluid pressure to one or the other chambers to produce axial movement of the piston sleeve.

As the piston sleeve linearly reciprocates in an axial direction within the body, the outer splines of the sleeve portion engage the splines of the body to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body.

While such an arrangement operating on hydraulic oil under high pressure produces a relatively high-torque output, there are situations in which it is desirable to construct a rotary actuator operating on air pressure at 80–100 psi or low pressure hydraulic oil. In this situation, a large piston is needed with a relatively long stroke to provide sufficient torque output. Of course, the size and weight of the actuator is thereby increased significantly. As such, it is desirable to substantially increase the output torque of the actuator over that normally available without significantly increasing the size or weight of the actuator. This allows construction of a high-output torque even when only a low-pressure hydraulic fluid (air, oil or other) source is available. When operating on air pressure it is sometimes also desirable to control the speed of piston operation as well as to cushion the piston by providing controlled deceleration of the piston.

In some situations, such as when used to operate a valve, it is desirable to have an actuator with a return assembly to automatically return the valve to a closed or open position should actuator fluid power failure occur, and to provide for self-contained redundancy. In yet another situation, it is desirable to have an actuator to which a separate hydraulic hand pump can be connected to operate the actuator if emergency operation is necessary.

When used as a valve actuator, it is also very important to align the end limits of rotational travel of the actuator drive shaft with the end limits of travel of the valve between its open and closed positions. Otherwise, the actuator may overdrive the valve or, alternatively, not drive the valve sufficiently to its fully open or closed position. As such, it is very important to have an actuator which can have its end limits of rotational travel easily adjusted to be aligned with the valve to which it is mounted while mounted on the valve.

It will therefore be appreciated that there has been a significant need for a fluid-powered actuator which fulfills these needs and provides these and other related advantages.

DISCLOSURE OF THE INVENTION

The present invention resides in a fluid-powered device, with a body having first and second axially spaced apart end walls, and a circumferential body sidewall. In the preferred embodiment of the invention, the circumferential body sidewall includes first-end and second-end circumferential sidewalls. The first-end sidewall extends axially from the first body end wall and terminates it in a first circumferential free end portion. The second-end sidewall extends axially from the second body end wall and terminates in a second circumferential free end portion axially spaced apart from the first circumferential free end portion to define an annular space therebetween.

The actuator further includes an axially transverse bulkhead positioned between the first and second body end walls and fixedly attached to the body sidewall during fluid-powered operation of the actuator. In the preferred embodiment, the bulkhead is selectively adjustably rotatable to angularly position the bulkhead in a desired stationary position relative to the body for fluid-powered operation. In this preferred embodiment, means are provided for selectively fixing the bulkhead in the selected angular position to hold the bulkhead stationary with respect to the body during fluid-powered operation of the actuator, and for selectively releasing the bulkhead to permit adjustable rotation of the bulkhead with respect to the body. The selective rotation is accomplished by providing the bulkhead with a perimeter portion extending into the annular space, and providing clamping means for selectively clamping the bulkhead perimeter portion in the annular space between the first and second circumferential free end portions and for selectively unclamping the bulkhead to permit adjustable rotation of the bulkhead with respect to the body.

The actuator further includes first and second piston heads disposed in the body for axial reciprocating movement. The first piston head is positioned between the bulkhead and the first body end wall and defines a first fluid-tight chamber between the first body end wall and the first piston head and a second fluid-tight chamber between the first piston head and the bulkhead. The second piston head is positioned between the bulkhead and the second body end wall and defines a third fluid-tight chamber between the bulkhead and the second piston head and a fourth fluid-tight chamber between the second piston head and the second body end wall.

Connector means are provided for fixedly interconnecting the first and second heads together against axial and rotational movement relative to each other so that the first and second piston heads form a piston assembly for reciprocating movement within the body in unison. An axially extending, rotatable shaft is positioned within the body and supported for rotation relative to the body. The shaft extends through an aperture in the first piston head. In the presently preferred embodiment, the shaft also extends through an aperture in the bulkhead and an aperture in the second piston head.

The actuator of the present invention further includes means for transmitting torque between the piston assembly and the bulkhead in response to reciprocating movement of the piston assembly, and means for transmitting torque between the piston assembly and the shaft in response to reciprocating movement of the piston assembly. Seal means are provided for preventing fluid leakage between the first, second, third and fourth fluid-tight chambers.

In one embodiment, the means for transmitting torque between the piston assembly and the bulkhead includes a plurality of axially extending guide rods fixedly attached to and extending between the first and second piston heads for reciprocating movement with the first and second piston heads, and a plurality of circumferentially distributed apertures in the bulkhead with each guide rod slidably received in one of the apertures. In another embodiment, the guide rods are provided but they are fixedly attached to and extend between the bulkhead and the first body end wall, and are slidably received in a plurality of circumferentially distributed apertures in the first piston head. In yet another embodiment, the torque transmitting means is a non-circular central aperture in the bulkhead which slidably receives a correspondingly shaped sleeve.

In the preferred embodiment of the invention, the means for interconnecting the first and second piston heads is an axially extending sleeve generally coaxially disposed in the body and projecting through a central bulkhead aperture. The sleeve has a central sleeve aperture through which the shaft extends. The sleeve is fixed to the first and second piston heads and extend therebetween for reciprocating movement with the first and second piston heads.

Other features and advantages of the invention will become apparent from the following detailed description, taken in conjunction with the accompanying drawings.

BRIEF DESCRIPTION OF THE DRAWINGS

FIG. 1 is an isometric, partially sectional view of a four chamber fluid-powered rotary actuator embodying the present invention using guide rods connected between a pair of pistons.

FIG. 2 is a top plan view of the actuator of FIG. 1.

FIG. 8 is a side elevational, sectional view of an alternative embodiment of the invention similar to the actuator of FIG. 1, but with the guide rods connected between the bulkhead and one end wall.

FIG. 10 is a top plan view of the actuator of FIG. 9.

BEST MODE FOR CARRYING OUT THE INVENTION

Figure 3:
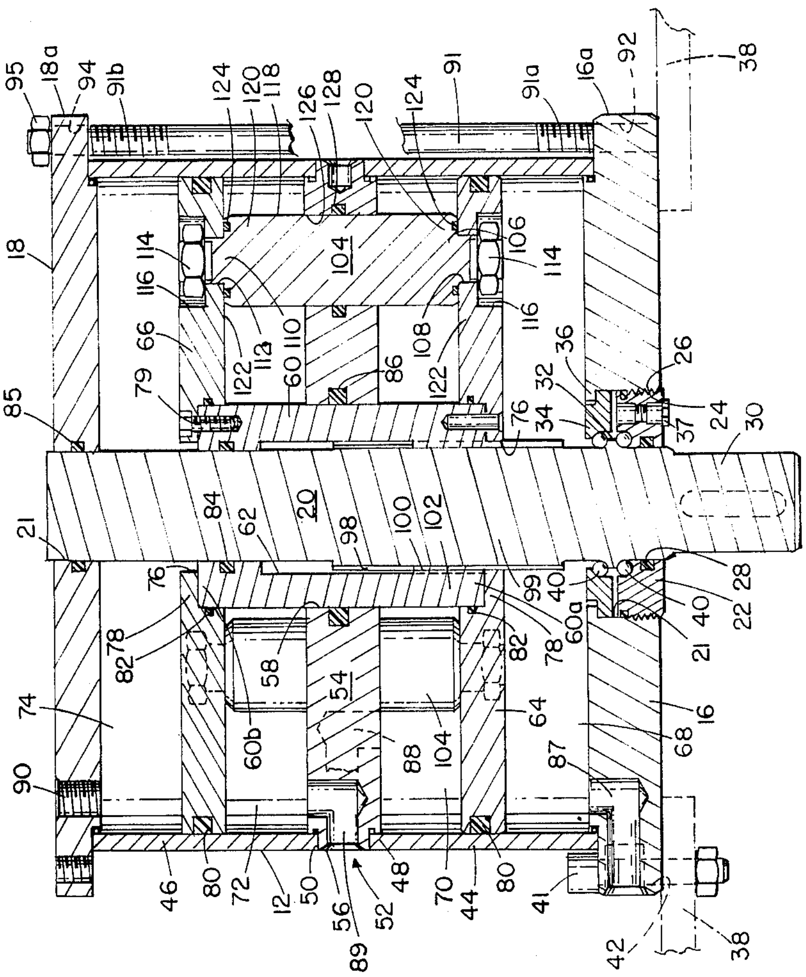
FIG. 3 is a side elevational, sectional view of the actuator taken substantially along the line 3—3 of FIG. 1.

As shown in the drawings for purposes of illustration, the present invention is embodied in a fluid-power actuator 10. A first embodiment of the device is the rotary actuator shown in FIGS. 1, 2 and 3. The actuator 10 includes an elongated housing or body 12 having a cylindrical sidewall 14 and first and second axially spaced-apart end walls 16 and 18, respectively. The first and second end walls 16 and 18 each have a circumferential flange portion 16*a* and 18*a*, respectively, extending radially outward beyond the sidewall 14. An elongated rotary output shaft 20 is coaxially positioned within the body 12 and supported for rotation relative to the body.

The shaft 20 extends through a central aperture 21 in each of the first and second body end walls 16 and 18 and exterior of the body 12. An annular end nut 22 is positioned at the first body end wall 16 in the aperture 21 and has a threaded outer perimeter portion 24 threadably attached to a threaded interior wall portion 26 of the first body end wall aperture. The end nut 22 has a central aperture 28 to receive an axially outward extending end portion 30 of the shaft 20. The shaft end portion 30 has a radially outward extending, circumferential flange portion 32 positioned at the first body end wall 16 between the end nut 22 and a stop ring 34. The stop ring 34 is held in place against axial movement toward the second body end wall 18 by an axially outward facing stop shoulder 36 of the first body end wall 16. The stop ring 34, the end nut 22 and the shaft flange portion 32 each include bearing races. The shaft 20 is rotatably held in place against axial thrust by thrust bearings 40 disposed between the shaft flange portion 32 and the stop ring 34 and between the shaft flange portion and the end nut 22. A lock screw 37 in the end nut 22 serves to lock the end nut against rotation once the shaft 20 is preloaded by tightening of the end nut to the degree desired.

The shaft end portion 30 is adapted for coupling to an external device (not shown) using any conventional means of attachement. The body 12 is adapted for attachment to a stationary support frame 38 (shown in phantom lines in FIG. 3) by attachment bolts 41 projecting through a plurality of recesses 42 circumferentially spaced about the flange portion 18*a* of the first body end wall 16. It is to be understood that the invention may be practiced with the shaft 20 rotatably driving an external device, such as a valve, or with the shaft being held stationary and the rotational drive being provided by rotation of the body 12.

The sidewall 14 of the body 12 is formed by a pair of first-end and second-end circumferential sidewalls 44 and 46, respectively. The first-end sidewall 44 extends axially from the first body end wall 16 toward the second body end wall 18 and terminates in a first circumferential, free end portion 48. The second end sidewall 46 extends axially from the second body end wall 18 toward the first body end wall 16 and terminates in a second circumferential, free end portion 50 axially spaced apart from the first circumferential free end portion 48 to define an annular space 52 therebetween. The actuator 10 has an axially transverse intermediate body wall or bulkhead 54 positioned about midway between the first and second body end walls 16 and 18 with a perimeter portion 56 extending into the annular space 52. The bulkhead 54 is adjustably rotatable in the space 52 about an axis concentric with the rotational axis of the shaft 20 to position the bulkhead in a desired angular position relative to the body 12. As will be described in more detail below, the bulkhead 54 is then clamped stationary with respect to the body 12 in the desired angular position for fluid-powered operation. The angular position in which the bulkhead 54 is clamped relative to the body 12 is used to adjust both end limits of rotational travel of the shaft 20 during fluid-powered operation.

The bulkhead 54 has a central aperture 58 therethrough to receive a sleeve 60. The sleeve 60 is coaxially and reciprocally mounted within the body 12 coaxially about the shaft 20, which extends through a central sleeve aperture 62. The sleeve 60 has fixedly attached at a first end 60*a* toward the first body end wall 16 a first piston head 64 and has fixedly attached at a second end 60*b* toward the second body end wall 18 a second piston head 66. The first and second piston heads 64 and 66 are disposed in the body 12 for simultaneous axial reciprocating movement. The first piston head 64 is positioned between the first body end wall 16 and the bulkhead 54 to define a first fluid-tight chamber 68 between the first body end wall and the first piston head, and a second fluid-tight chamber 70 between the first piston head and the bulkhead. The second piston head 66 is positioned between the bulkhead 54 and the second body end wall 18 to define a third fluid-tight chamber 72 between the bulkhead and the second piston head, and a fourth fluid-tight chamber 74 between the second piston head and the second body end wall 18.

Each of the first and second piston heads 64 and 66 has a central aperture 76 therethrough through which the shaft 20 extends. At each of the piston head central apertures 76 is a circumferential shoulder 78 sized to snugly receive a corresponding one of the first or second ends 60*a* or 60*b* of the sleeve 60 therein. A plurality of fasteners 79 fixedly attach the first and second piston heads 64 and 66 to the sleeve 60 and connect the piston heads together against axial and rotational movement relative to each other. As such, the first and second piston heads 64 and 66 form a piston assembly for reciprocating movement within the body 12 in unison.

The first and second piston heads 64 and 66 carry conventional seals 80, disposed between the first and second piston heads and a corresponding interior smooth wall portion of the first-end and second-end circumferential body sidewalls 44 and 46, respectively. The smooth sidewall portions have sufficient axial length to accommodate the full stroke of the piston heads within the body 12. Conventional seals 82 are also provided between the first and second piston heads 64 and 66 at the stop shoulder 78 to provide a fluid-tight seal between the piston heads and the sleeve 60. The sleeve 60 carries a conventional seal 84, disposed between the sleeve and a corresponding smooth exterior surface portion of the shaft 20 which has sufficient axial length to accommodate the full stroke of the piston heads. The bulkhead 54 has a conventional seal 86 extending about its central aperture 58 disposed between the bulkhead and a corresponding exterior smooth surface portion of the sleeve 60 which has sufficient axial length to accommodate the full stroke of the piston heads 64 and 66. A conventional seal 85 extends about the second body end wall aperture 21 disposed between the second body end wall 18 and the shaft 20.

The actuator 10 is provided with four ports communicating with the four fluid-tight chambers 68, 70, 72 and 74. A first port 87 is located in the first body end wall 16 and communicates with the first fluid-tight chamber 68. A second port 88, shown in phantom line in FIG. 3, is located in the bulkhead 54 and communicates with the second fluid-tight chamber 70. A third port 89 is also located in the bulkhead 54 and communicates with the third fluid-tight chamber 72. A fourth port 90 is located in the second body end wall 18 and communicates with the fourth fluid-tight chamber 74. Each of the ports is provided with means for connection to a conventional hose connector of a type suitable for the fluid being used. The particular interconnections being used to communicate with the four fluid-tight chambers and the types of external components being connected to the chamber ports will allow the use of the actuator 10 of the present invention in one of several different manners. Four such uses are shown in FIGS. 4–7, which will be described below.

The actuator 10 further includes six tie rods 91 which extend between and apply axially inward directed forces to both the first and second body end walls 16 and 18 to clamp the perimeter portion 56 of the bulkhead 54 between the first and second circumferential free end portions 48 and 50 of the first-end and second-end sidewalls 44 and 46. Each of the tie rods 91 has a threaded first end portion 91*a* threadably received in a threaded aperture 92 in the first body end wall flange portion 16*a*, and a threaded second end portion 91*b* projecting through a smooth bore aperture 94 in the second body end wall flange portion 18*a* and therebeyond to receive a nut 95. The nuts 95 of the tie rods 91 may be selectively loosened to unclamp the bulkhead 54 and permit its adjustable angular rotation with respect to the body 12. Tightening of the nuts 95 on the tie rods 91 pulls the first and second body end walls 16 and 18 toward each other, and hence also the first-end and second-end sidewalls 44 and 46, to clamp the bulkhead 54 in place in the annular space 52 so that the bulkhead is stationary with respect to the body 12 during fluid-powered operation of the actuator 10.

For purposes of illustration, the actuator 10 will now be described as connected for maximum torque operation in the manner shown in the schematic drawing of FIG. 5. When so connected, reciprocation of the first and second piston heads 64 and 66 occurs as a unit within the body 12 when air, oil or other hydraulic fluid under pressure selectively enters either through the first and third ports 88 and 92 which are externally connected together and to a source of pressurized air 96 to simultaneously apply fluid pressure to both the first and third fluid-tight chambers 68 and 72, or through the second and fourth ports 90 and 94 which are externally connected together and to the pressurized air source to simultaneously apply fluid pressure to the second and fourth fluid-tight chambers 70 and 74. As used herein, "hydraulic fluid" will refer to hydraulic oil, air, or any other fluid suitable for use in the actuator 10. The application of fluid pressure to the chambers 68 and 72 produces axial movement of the piston assembly comprised of the first and second piston heads 64 and 66 and the sleeve 60 toward the second body end wall 18. The application of fluid pressure to the chambers 70 and 74 produces axial movement of the piston assembly toward the first body end wall 16. The actuator 10 provides relative rotational movement between the body 12 and the shaft 20 through the conversion of linear movement of the piston assembly produced by fluid pressure into rotational movement of the shaft, as will be described in more detail below.

The conversion of linear movement of the piston assembly into rotational movement of the shaft 20 is accomplished by providing means for transmitting torque between the piston assembly and the bulkhead 54 in response to reciprocating movement of the piston assembly and means for transmitting torque between the piston assembly and the shaft in response to reciprocating movement of the piston assembly. In the first embodiment of the invention shown in FIGS. 1–3, the means for transmitting torque between the piston assembly and the shaft 20 includes outer helical splines 98 formed integrally on an axially extending midportion 99 of the shaft 20 which mesh with inner helical splines 100 formed integrally on an interior portion 102 of the sleeve 60 toward its first end 60*a*.

The means for transmitting torque between the piston assembly and the bulkhead 54 includes four axially extending guide rods 104 having a first threaded end portion 106 with a reduced diameter toward the first body end wall 16, which projects through one of four circumferentially distributed apertures 108 in the first piston head 64, and a second threaded end portion 110 with a reduced diameter toward the second body end wall 18 which projects through one of four circumferentially distributed apertures 112 in the second piston head 66. Each of the first and second end portions 106 and 110 threadably receives a nut 114 which is positioned in a recess 116 provided in each of the first and second piston heads. In such manner, the four guide rods 104 are fixedly attached to and extend between the first and second piston heads 64 and 66 for reciprocating movement with the piston heads. Each of the guide rods 104 has a smooth exterior surface 118 and an axially outward facing shoulder 120 at the transition to the corresponding reduced diameter first and second end portions 106 and 110 for engaging an axially inward facing surface portion 122 of the corresponding first or second piston heads 64 or 66. A conventional seal 124 is disposed in each of the guide rod shoulders 120 to provide a fluid-tight seal between the corresponding first or second piston head 64 or 66 and the guide rod 104 to prevent leakage of fluid through the apertures 108 between the first and second fluid-tight chambers 68 and 70 and through the apertures 112 between the third and fourth fluid-tight chambers 72 and 74.

The four guide rods 104 each extend through and are slidably disposed in one of four circumferentially distributed apertures 126 in the bulkhead 54. The apertures 126 slidably receive the guide rods 104 as they reciprocate with the first and second piston heads 64 and 66. The bulkhead 54 has a conventional seal 128 extending about each of the apertures 126 disposed between the bulkhead and the corresponding guide rod received in the aperture to provide a fluid-tight seal to prevent leakage of fluid between the second and third fluid-tight chambers 70 and 72.

As noted above, the four guide rods 104 are fixedly attached to both the first and second piston heads 64 and 66. The guide rods 104 serve both to supply additional strength and stability to the interconnection between the first and second piston heads 64 and 66 provided by the sleeve 60 and, more importantly, to transmit torque between the bulkhead 54 and the first and second piston heads and the sleeve as they reciprocate as a piston assembly. The guide rods 104 are straight and in parallel axial alignment with the shaft 20, thus preventing rotation of the piston assembly relative to the body 12 as the first and second piston heads 64 and 66 reciprocate within the body. By so doing, the guide rods 104 also transmit torque between the piston assembly and the body 12 through the bulkhead 54. This torque is in reaction to the rotational force applied to the shaft 20 through the intermeshing helical splines 98 and 100 of the shaft 20 and sleeve 60 which causes the shaft to rotate relative to the body 12 as the piston assembly linearly reciprocates between one or the other axial directions within the body through the application of fluid pressure to one or more of the fluid-tight chambers 68, 70, 72 or 74.

As noted above for the fluid connections shown in FIG. 5, fluid pressure can be applied simultaneously to two chambers to the same axial side of the first and second piston heads 64 and 66 to provide doubling of the normal torque output which would result from use of a single piston head. The axial force created by fluid pressure on the first and second heads 64 and 66 causes the piston assembly to move axially and transmits rotational force to the shaft 20 since axial movement of the shaft is restricted by the thrust bearings 40. The shaft 20 is rotated clockwise or counterclockwise, depending upon whether the meshing splines 98 and 100 have a left-hand or right-hand turn.

The ability to produce twice the normal torque output is the result of providing the actuator 10 with four fluid-tight chambers so that the fluid pressure is applied against two piston heads at once and providing adequate sealing of the reciprocating piston assembly to prevent fluid leakage between the chambers. The present invention accomplishes this result with a bridge arrangement between the piston heads 64 and 66 which transmits torque to the body 12 through the bulkhead 54 while providing adequate sealing. The actuator avoids the use of a splined body sidewall and the use of heavy ring gears. Further, the actuator 10 has the needed large piston head area for pressurized air operator to produce adequate torque output. These results are achieved without adding significant length to the actuator since the addition of the second piston head does not require another sleeve and adds only its own axial thickness to the overall axial length of the actuator, but yet doubles the torque output. The actuator 10 of the present invention can be manufactured with a lightweight and compact construction for applications where weight and size are factors, while still providing high torque output.

It is to be understood that while the embodiment of FIGS. 1–3 has been described as a fluid-powered rotary actuator, devices of the same of the general construction utilizing the invention may be manufactured for a variety of uses. Additionally, the actuator may be constructed as a linear actuator, with the shaft 20 partially or completely restrained against rotation but permitted to move axially within the body 12 in response to reciprocation of the first and second piston heads 64 and 66.

For ease of understanding, the components of the alternative embodiments of the invention described hereinafter will be similarly numbered with those of the first embodiment when of a similar construction. Only the differences in construction will be described in detail.

Figure 4:
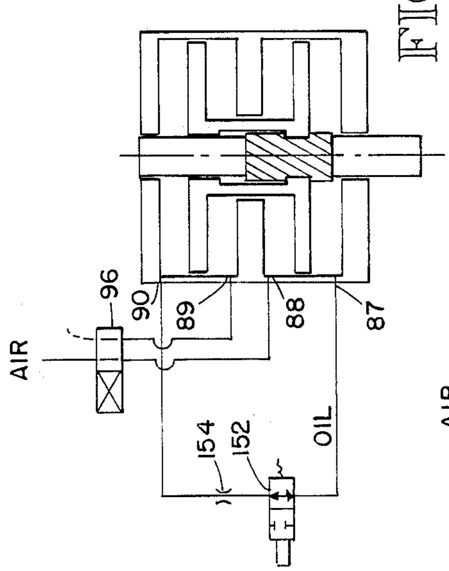
FIG. 4 is a schematic diagram of the actuator of FIG. 1 connected to an air pressure source to power two chambers, with hydraulic oil applied to the two other chambers for speed and positioning control.
Figure 5:
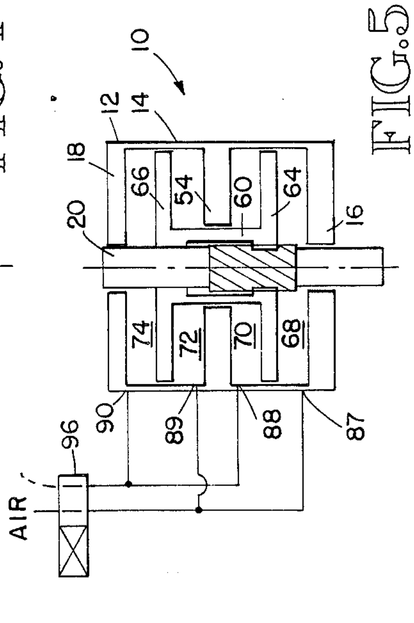
FIG. 5 is a schematic diagram of the actuator of FIG. 1 connected to an air pressure source to simultaneously power two chambers for travel in each axial direction to double the output torque of the actuator.

The first embodiment of the invention shown in FIG. 5 is connected for maximum torque output on the shaft 20. While this provides the highest power density, reduced actuator life can be expected since none of the torque-transmitting components are lubricated. An alternative manner of operating the four chamber actuator 10 is shown in FIG. 4 which overcomes this problem and provides other advantages, although with a reduced output torque resulting. In this embodiment, the source of pressurized air 96 is connected only to the second and third fluid-tight chambers 70 and 72 by the ports 88 and 89 to supply drive power to the first and second piston heads 64 and 66. The first and fourth fluid-tight chambers 68 and 74 are filled with hydraulic oil and are connected by the ports 87 and 90 to a reservoir of oil 152. While the actuator 10 is powered by the pressurized air working on the first and second piston heads 64 and 66, the oil in the third and fourth fluid-tight chambers 68 and 74 can be metered to accurately control the speed at which the actuator is driven by the pressurized air source, and provide controlled deceleration for the piston heads to provide cushioning.

By operation of a solenoid valve 154 to close off oil flow to or from the chambers, the valve serves to lock the position of the first and second piston heads against axial movement within the body 12, and hence lock the shaft 20 against rotational movement such as encountered when connected to a large load which might apply a back torque to the shaft. The first and second piston heads 64 and 66 are locked in position by the valve 154 because of the incompressible nature of the oil. In addition to the control provided by the hydraulic oil, the use of oil in the first fluid-tight chamber 68 has the benefit of providing lubrication to the meshing shaft and sleeve splines 98 and 100 to reduce the drag and wear they experience and increase the operating efficiency of the actuator. This is accomplished while maintaining the second and third fluid-tight chambers 70 and 72 free of oil contamination for operation under air pressure.

Figure 6:
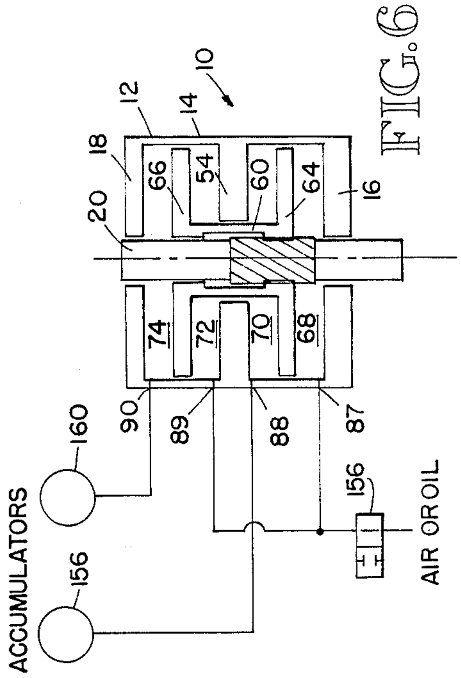
FIG. 6 is a schematic diagram of the actuator of FIG. 1 used as a valve actuator with two independent accumulators connected to two chambers for safety through redundancy.

Yet another manner of connecting the actuator 10 of the present invention is shown in FIG. 6. The first and third fluid-tight chambers 68 and 72 are connected by the ports 87 and 89 to a source 156 of pressurized air or oil, as desired, and separate accumulators 158 and 160 are connected by the ports 88 and 90 to each of the second and fourth fluid-tight chambers 70 and 74, respectively. The accumulators are pressure-charged to drive the first and second piston heads 64 and 66 toward the first body end wall 16 in the event of an emergency so as to close or open, as desired, the valve or other device which is being driven by the actuator 10. Such an emergency would arise in the event of failure of the pressurized air or oil supply 156, which is applied to the first and third fluid-tight chambers 68 and 72, which normally drive the first and second pistons 64 and 66. By the use of redundant accumulators each communicating with a separate fluid-tight chamber, even should one of the accumulators or the fluid-tight chamber to which the accumulator supplies its pressure fail, the other accumulator and the fluid-tight chamber to which it is connected would be available to drive the first and second piston heads toward the first body end wall 16 to accomplish the desired opening or closing of the valve or other device to which the actuator is connected. This is, of course, only possible by the use of an actuator with four separate fluid-tight chambers.

Figure 7:
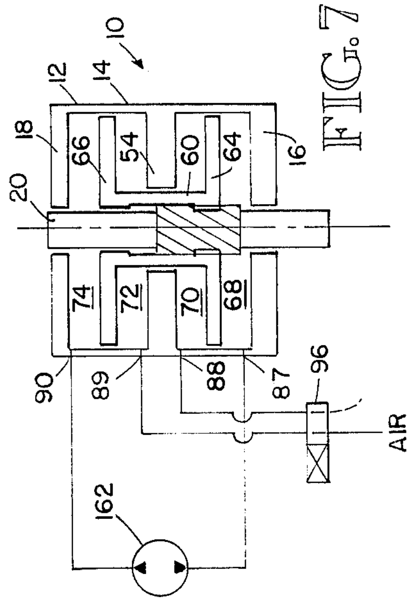
FIG. 7 is a schematic diagram of the actuator of FIG. 1 connected to an air pressure source to power two chambers and to a hydraulic hand pump to manually power the two other chambers for emergency operation.

Finally, in FIG. 7, another manner of connection of the actuator 10 of the present invention is shown which utilizes the four-chamber arrangement by the pressurized air source 96 being supplied to the second and third fluid-tight chambers 70 and 72 through the ports 88 and 89 to selectively drive the first and second piston heads 64 and 66 toward the first or second body end walls 16 or 18 to cause selective rotation of the shaft 20. A hydraulic hand pump 162 using hydraulic oil is connected to the first and fourth fluid-tight chambers 68 and 74 by the ports 87 and 90 so that the actuator can be hand operated in an emergency situation such as when the air supply 96 fails.

As can be seen by FIGS. 4–7, there are a variety of useful applications for the actuator 10 as a result of its four independent fluid-tight chambers provided within the same body, with the first and second piston heads connected together to form a piston assembly traveling in unison. The four fluid-tight chambers can be variously interconnected for unprecedented operating flexibility. The benefits provided by the actuator 10 are possible in large part because of the use of the stationary bulkhead 54, which, in combination with the guide pins 104, provides a convenient method for transmitting torque between the piston assembly and the body 12, which can be conveniently and effectively sealed against fluid leakage between the chambers as the piston assembly reciprocates. As previously mentioned, another benefit of the actuator 10 of the present invention is the fact that the bulkhead 54 can be adjustably rotated relative to the body 12 to set the rotational end positions of the shaft 20 relative to the valve or other device to which the actuator is connected while it is connected to the valve or device. While not illustrated, it is also possible to design the body 12 and the piston heads 64 and 66 so that one of the piston heads is larger in diameter than the other to produce differing output torque on the shaft depending on the direction it is being driven. The actuator 10 of the present invention provides all these benefits with a very compact design which is achieved in part by the used of a piston head on each end of the sleeve 60.

An alternative embodiment of the invention very similar to the embodiment of FIGS. 1–3 is shown in FIG. 8. In this embodiment, the guide rods 104 are fixedly attached to and extend between the bulkhead 54 and the first body end wall 16, and each projects through one of four circumferentially distributed apertures 164 in the first piston head 64. A conventional seal 166 is carried by the first piston head 64 in the aperture 164 to prevent the leakage of fluid between the first and second fluid-tight chambers 68 and 70. As with the embodiment of FIG. 1, the guide rods 104 transmit torque between the body 12 and the piston assembly comprised of the first and second piston heads 64 and 66 and the sleeve 60, although in this embodiment through the sliding engagement of the first piston head with the guide rods which are fixedly connected to the bulkhead 54 and the first body end wall 16. In almost all other significant aspects, the actuator of FIG. 8 is identical to the actuator of FIGS. 1-3.

Figure 9:
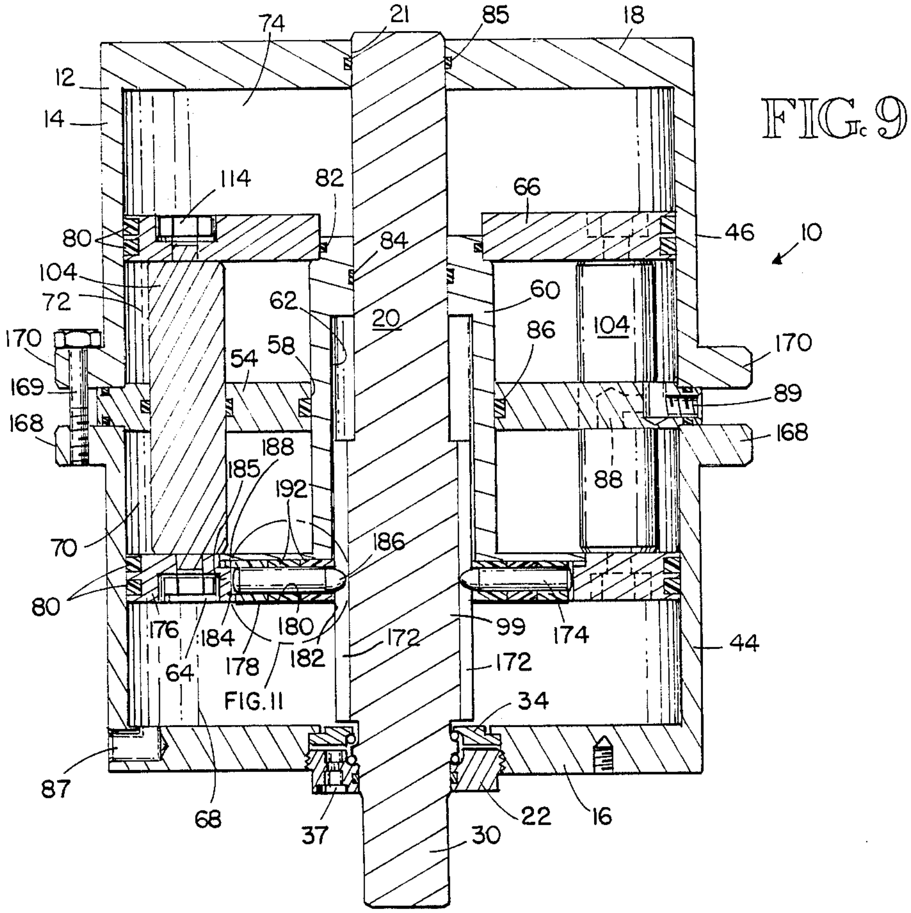
FIG. 9 is a side elevational, sectional view of another alternative embodiment of the invention similar to the actuator of FIG. 1, but utilizing cam follower guide pins for torque transmission between the sleeve and shaft, taken substantially along the line 9—9 of FIG. 10.
Figure 11:
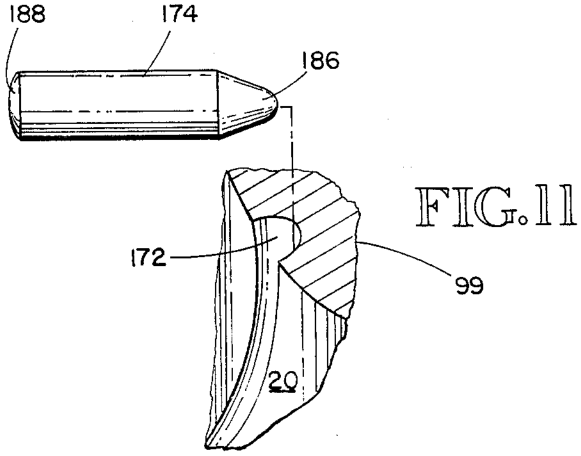
FIG. 11 is an enlarged, fragmentary, partially sectional view of the encircled portion of FIG. 9.
Figure 13:
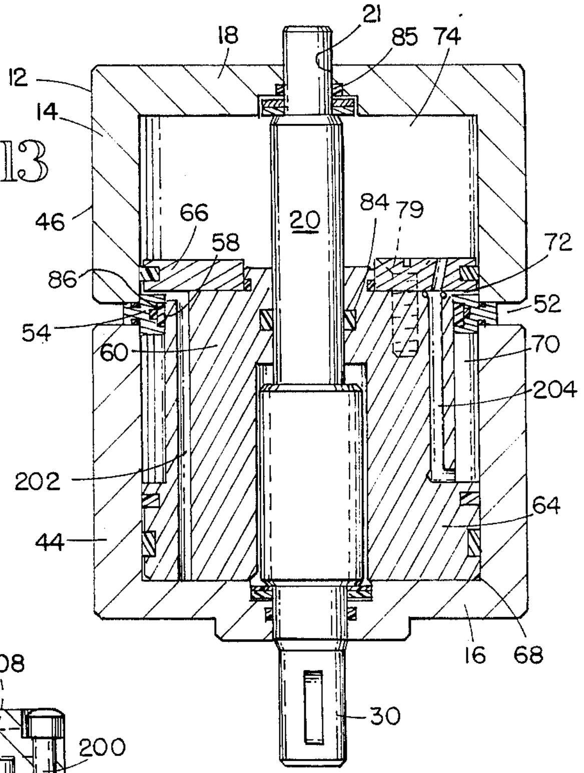
FIG. 13 is a side elevational, partially sectional view of the actuator of FIG. 12 taken substantially along the line 13—13 of FIG. 14.

Another alternative embodiment of the invention very similar to the embodiment of FIGS. 1-3 is shown in FIGS. 9-11. In this embodiment, the actuator 10 does not utilize tie rods 91, but rather each of the first-end and second-end circumferential sidewalls 44 and 46 has a circumferentially extending flange 168 and 170, respectively, located at its end free portion 48 and 50 and held together by bolts 169 to apply the clamping force on the bulkhead 54. Another significant difference in the design is the replacement of the meshing shaft and sleeve splines 98 and 100 with eight helical grooves 172 integrally formed on the midportion 99 of the shaft 20 and extending over the axial length of the midportion and eight guide pins 174 which engage the helical grooves 172 to transmit torque between the piston assembly and the shaft. The grooves 172 have substantially identical lead and pitch.

To accommodate the guide pins 174, the first piston head 64 has a two-piece construction comprised of an annular outer ring 176 to which the guide rods 104 are attached and an annular inner ring 178. The inner ring 178 fits within the outer ring and is fixedly attached thereto for operation as an integral unit to form the first piston head 64. The inner ring 178 has eight circumferentially distributed, radially extending throughbores 180 which extend fully therethrough. The throughbores 180 are positioned with an inward end bore opening 182 adjacent to the grooved shaft midportion 99. Each of the throughbores 180 further has an outward end bore opening 184 positioned radially outward from the inward end bore opening 182 and adjacent to an inward circumferential wall 185 of the outer ring 176.

Each of the guide pins 174 is disposed in a different one of the inner ring throughbores 180 and projects out of the inward end bore opening 182 to position a tapered inward end 186 of the guide pin in a different one of the eight shaft grooves 172 to rollingly engage the sidewalls of the groove. The guide pins 174 have sufficient length to position a curved outward end 188 of each guide pin at the outward end bore opening 184. Positioned between the inward circumferentially wall 186 of the outer ring 176 and the outward end 188 of the guide pins 174 is a circumferentially extending antifriction bearing ring 190 to facilitate the free rotation of the guide pins 174 in the inner ring throughbores 180.

To further facilitate the free rotation of the guide pins 74, each guide pin is journaled in one of the inner ring throughbore 180 by three rows of needle roller bearings 192. The needle roller bearings 192 are circumferentially distributed about each guide pin 174 between the guide pin and the interior wall of the inner ring throughbore within which the guide pin is disposed. As such, the guide pins 174 rotate freely as the guide pin tapered inward ends 186 rollably engage the shaft grooves 172 during fluid-powered operation of the actuator 10. The guide pins 174 have sufficient length that the tapered inward ends 186 of the guide pins extend fully to the bottom of the shaft grooves 172 in which positioned when the outward ends 188 of the guide pins are engaging the bearing ring 190. As noted above, the guide pins 174 transmit torque between the first piston head 64 and the shaft 20 in response to axial movement of the piston assembly.

Figure 12:
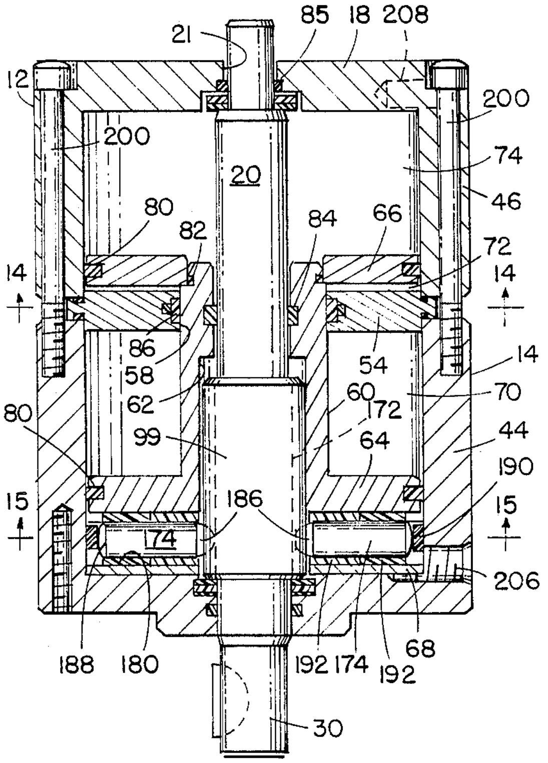
FIG. 12 is a side elevational, sectional view of yet another alternative embodiment of the invention using an eccentric sleeve instead of guide rods.
Figure 14:
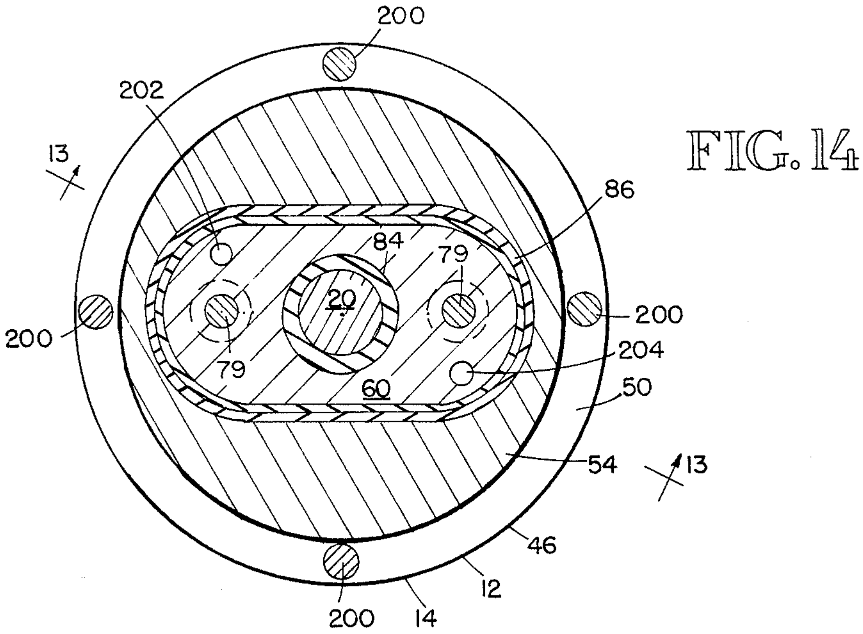
FIG. 14 is an end sectional view taken substantially along the line 14—14 of FIG. 12.
Figure 15:
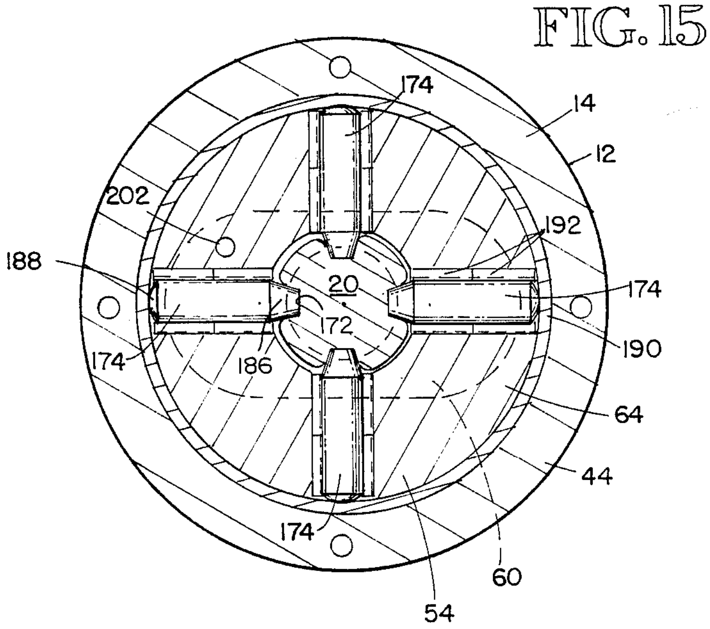
FIG. 15 is an end sectional view taken substantially along the line 15—15 of FIG. 12.

Yet another alternative embodiment of the invention very similar in many ways to the embodiments of FIGS. 1-3 and FIGS. 9-11, is shown in FIGS. 12-15. In this embodiment, a somewhat different construction is used in that the first and second body end walls 16 and 18 are formed as an integral part of the first-end and second-end circumferential sidewalls 44 and 46. Further, rather than using tie rods 91, this embodiment of the actuator uses a plurality of bolts 200 which hold together the first-end and second-end circumferential sidewalls 44 and 46 and provide the clamping force on the bulkhead 54, as best shown in FIG. 12. Elimination of the tie rods is particularly important for smaller diameter actuators since tie rods and the necessary circumferential flange portions 16*a* and 18*a* tend to enlarge the overall diameter of the actuator since the tie rods must be positioned outward of the body sidewall 14.

One of the more significant differences of the embodiment of FIGS. 12-15 is that the sleeve 60 has an eccentric outer shape and the aperture 58 in the bulkhead 54 through which the sleeve slidably projects has a similar eccentric shape and size. As such, the application of fluid pressure to selective ones of the fluid-tight chambers 68-74 will cause linear movement of the piston assembly, with the reactionary rotational torque being applied to the bulkhead 54 as a result of the eccentric aperture 58 inhibiting rotation of the eccentric sleeve 60, much as the guide rods 104 prevented rotation of the piston assembly.

The actuator 10 of FIGS. 12-15 is internally ducted so that the first and third fluid-tight chambers 68 and 72 are connected together for fluid communication therebetween by a fluid passage 202 through the first piston head 64 and the sleeve 60. Similarly, the second and fourth fluid-tight chambers 70 and 74 are connected together for fluid communication therebetween by a fluid passage 204 through the sleeve 60 and the second piston head 66. In this embodiment, only two fluid ports 206 and 208 are provided and they communicate directly with the first and fourth fluid-tight chambers 68 and 74, respectively. The passages 202 and 204 provide the means by which fluid pressure is simultaneously applied to the second and third fluid-tight chambers 70 and 72 to provide the same double torque output as described for the connections shown in FIG. 5.

In this embodiment, the first piston head 64 is formed integrally with the sleeve 60 and, unlike the embodiment of FIGS. 9 and 10, the piston head is formed without the need to utilize the two annular rings 176 and 178. As such, the radial throughbores 180 in which the guide pins 174 are disposed extend fully through the first piston head and the bearing ring 190 is positioned between the outer end 188 of the guide pins and an inner side of the first-end circumferential sidewall 44 of the body sidewall 14. This embodiment of the invention is considered most appropriate for smaller diameter actuators, such as in the range of 6 to 8 inches, although smaller and larger diameter actuators could be constructed with the same design.

It will be appreciated that although specific embodiments of the invention have been described herein for purposes of illustration, various modifications may be made without departing from the spirit and scope of the invention. Accordingly, the invention is not limited except as by the appended claims.

I claim:

1. A fluid-powered actuator comprising:

a body having first and second axially spaced-apart end walls, and first end and second end circumferential sidewalls, said first end sidewall extending axially from said first body end wall and terminating in a first circumferential free end portion and said second end sidewall extending axially from said second body end wall and terminating in a second circumferential free end portion axially spaced apart from said first circumferential free end portion to define an annular space therebetween;

an axially transverse bulkhead positioned between said first and second body end walls and having a perimeter portion extending into said annular space, said bulkhead being adjustably rotatable in said space to angularly position said bulkhead in a desired stationary position relative to said body for fluid-powered operation of the actuator, said bulkhead having a central aperture therethrough;

clamping means for selectively clamping said bulkhead perimeter portion in said annular space between said first and second circumferential free end portions to hold said bulkhead stationary with respect to said body during fluid-powered operation of the actuator, and for selectively unclamping said bulkhead to permit adjustable rotation of said bulkhead with respect to the body;

a first piston head disposed in said body for axial reciprocating movement, said first piston head being positioned between said bulkhead and said first body end wall and defining a first fluid-tight chamber between said first body end wall and said first piston head and a second fluid-tight chamber between said first piston head and said bulkhead, said first piston head having a central aperture therethrough;

a second piston head disposed in said body for axial reciprocating movement, said second piston head being positioned between said bulkhead and said second body end wall and defining a third fluid-tight chamber between said bulkhead and said second piston head and a fourth fluid-tight chamber between said second piston head and said second body end wall, said second piston head having a central aperture therethrough;

connector means for fixedly interconnecting said first and second piston heads together against axial and rotational movement relative to each other such that said first and second piston heads form a piston assembly for reciprocating movement within said body in unison;

an axially entending, rotatable shaft positioned within said body and supported for rotation relative to said body, said shaft extending through said first piston head aperture, said bulkhead central aperture and said second piston head aperture;

first torque-transmitting means for transmitting torque between said piston assembly and said bulkhead in response to reciprocating movement of said piston assembly;

second torque-transmitting means for transmitting torque between said piston assembly and said shaft in response to reciprocating movement of said piston assembly;

first seal means for providing a fluid-tight seal between said first piston head and said body;

second seal means for providing a fluid-tight seal between said second piston head and said body;

third seal means for providing a fluid-tight seal between said shaft and said piston assembly; and fourth seal means for providing a fluid-tight seal between said connector means and said bulkhead.

2. The actuator of claim 1 wherein said connector means is an axially extending sleeve generally coaxially disposed in said body and projecting through said central bulkhead aperture, said sleeve having a central sleeve aperture through which said shaft extends, said sleeve being fixed to said first and second piston heads and extending therebetween for reciprocating movement with said first and second piston heads.

3. The actuator of claim 2 wherein said sleeve has a smooth outer circumferential sidewall portion, and said fourth seal means includes a seal positioned to seal between said smooth sleeve sidewall portion and said bulkhead at said bulkhead central aperture.

4. The actuator of claim 1 wherein said first torque-transmitting means includes a plurality of axially extending guide rods fixedly attached to and extending between said first and second piston heads for reciprocating movement with said first and second piston heads, and a plurality of circumferentially distributed apertures in said bulkhead which each slidably receive one of said guide rods.

5. The actuator of claim 4 wherein said guide rods each have a smooth outer circumferential sidewall portion, and the actuator further includes a plurality of seals, each said seal being positioned to seal between one of said guide rod sidewall portions and said bulkhead at one of said circumferentially distributed bulkhead apertures.

6. The actuator of claim 4 wherein said connector means is an axially extending sleeve generally coaxially disposed in said body and projecting through said central bulkhead aperture, said sleeve having a central sleeve aperture through which said shaft extends, said sleeve being fixed to said first and second piston heads and extending therebetween for reciprocating movement with said first and second piston heads.

7. The actuator of claim 6 wherein said sleeve has a smooth outer circumferential sidewall portion, and said fourth seal means includes a seal positioned to seal between said smooth sleeve sidewall portion and said bulkhead at said bulkhead central aperture.

8. The actuator of claim 1 wherein said first torque-transmitting means includes a plurality of axially extending guide rods fixedly attached to and extending between said bulkhead and said first body end wall, and a plurality of circumferentially distributed apertures in said first piston head which each slidably receive one of said guide rods.

9. The actuator of claim 8 wherein said guide rods each have a smooth outer circumferential sidewall portion, and the actuator further includes a plurality of seals, each said seal being positioned to seal between one of said guide rod smooth sidewall portions and said first piston head at one of said circumferentially distributed piston head apertures.

10. The actuator of claim 8 wherein said connector means is an axially extending sleeve generally coaxially disposed in said body and projecting through said central bulkhead aperture, said sleeve having a central sleeve aperture through which said shaft extends, said sleeve being fixed to said first and second piston heads and extending therebetween for reciprocating movement with said first and second piston heads.

11. The actuator of claim 10 wherein said sleeve has a smooth outer circumferential sidewall portion, and said fourth seal means includes a seal positioned to seal between said smooth sleeve sidewall portion and said bulkhead at said bulkhead central aperture.

12. The actuator of claim 1 wherein said clamping means includes a plurality of tie rods extending between and applying axially inwardly directed forces on said first and second body end walls to clamp said bulkhead between said first and second free end portions of said first and second end sidewalls portions.

13. The actuator of claim 1 wherein said clamping means includes a first flange attached to said first end sidewall and a second flange attached to said second end sidewall adjacent to said first flange, with a plurality of fasteners extending between said first and second flanges to apply axially inward directed forces on said first and second end sidewalls to clamp said bulkhead between said first and second free end portions of said first and second end sidewalls.

14. A fluid-powered actuator comprising:

a body having first and second axially spaced-apart end walls, and a circumferential body sidewall;

an axially transverse bulkhead positioned between said first and second body end walls and selectively adjustably rotatable to angularly position said bulkhead in a desired stationary position relative to said body for fluid-powered operation of the actuator;

means for selectively fixing said bulkhead in a selected angular position to hold said bulkhead stationary with respect to said body during fluid-powered operation of the actuator, and for selectively releasing said bulkhead to permit adjustable rotation of said bulkhead with respect to the body;

a first piston head disposed in said body for axial reciprocating movement, said first piston head being postioned between said bulkhead and said first body end wall and defining a first fluid-tight chamber between said first body end wall and said first piston head and a second fluid-tight chamber between said first piston head and said bulkhead, said first piston head having a central aperture therethrough;

a second piston head disposed in said body for axial reciprocating movement, said second piston head being positioned between said bulkhead and said second body end wall and defining a third fluid-tight chamber between said bulkhead and said second piston head and a fourth fluid-tight chamber between said second piston head and said second body end wall;

connector means for fixedly interconnecting said first and second piston heads together against axial and rotational movement relative to each other such that said first and second piston heads form a piston assembly for reciprocating movement within said body in unison;

an axially entending, rotatable shaft positioned within said body and supported for rotation relative to said body, said shaft extending through said first piston head aperture;

first torque-transmitting means for transmitting torque between said piston assembly and said bulkhead in response to reciprocating movement of said piston assembly;

second torque-transmitting means for transmitting torque between said piston assembly and said shaft in response to reciprocating movement of said piston assembly; and seal means for preventing fluid leakage between said first, second, third and fourth fluid-tight chambers.

15. The actuator of claim 14 wherein said connector means is an axially extending sleeve generally coaxially disposed in said body and projecting through a central bulkhead aperture, said sleeve having a central sleeve aperture through which said shaft extends, said sleeve being fixed to said first and second piston heads and extending therebetween for reciprocating movement with said first and second piston heads.

16. The actuator of claim 15 wherein said sleeve has a smooth outer circumferential sidewall portion, and said seal means includes a seal positioned to seal between said smooth sleeve sidewall portion and said bulkhead at said bulkhead central aperture.

17. The actuator of claim 14 wherein said first torque-transmitting means includes a plurality of axially extending guide rods fixedly attached to and extending between said first and second piston heads for reciprocating movement with said first and second piston heads, and a plurality of circumferentially distributed apertures in said bulkhead which each slidably receive one of said guide rods.

18. The actuator of claim 17 wherein said guide rods each have a smooth outer circumferential sidewall portion, and said seal means includes a plurality of seals, each said seal being positioned to seal between one of said guide rod sidewall portions and said bulkhead at one of said circumferentially distributed bulkhead apertures.

19. The actuator of claim 17 wherein said connector means is an axially extending sleeve generally coaxially disposed in said body and projecting through said central bulkhead aperture, said sleeve having a central sleeve aperture through which said shaft extends, said sleeve being fixed to said first and second piston heads and extending therebetween for reciprocating movement with said first and second piston heads.

20. The actuator of claim 19 wherein said sleeve has a smooth outer circumferential sidewall portion, and said seal means includes a seal positioned to seal between said smooth sleeve sidewall portion and said bulkhead at said bulkhead central aperture.

21. The actuator of claim 14 wherein said first torque-transmitting means includes a plurality of axially extending guide rods fixedly attached to and extending between said bulkhead and said first body end wall, and a plurality of circumferentially distributed apertures in said first piston head which each slidably receive one of said guide rods.

22. The actuator of claim 21 wherein said guide rods each have a smooth outer circumferential sidewall portion, and said seal means includes a plurality of seals, each said seal being positioned to seal between one of said guide rod smooth sidewall portions and said first piston head at one of said circumferentially distributed piston head apertures.

23. The actuator of claim 21 wherein said connector means is an axially extending sleeve generally coaxially disposed in said body and projecting through a central bulkhead aperture, said sleeve having a central sleeve aperture through which said shaft extends, said sleeve being fixed to said first and second piston heads and extending therebetween for reciprocating movement with said first and second piston heads.

24. The actuator of claim 23 wherein said sleeve has a smooth outer circumferenetial sidewall portion, and said seal means includes a seal positioned to seal between said smooth sleeve sidewall portion and said bulkhead at said bulkhead central aperture.

25. A fluid-powered actuator comprising:

a body having first and second axially spaced-apart end walls, and a circumferential body sidewall;

an axially transverse bulkhead positioned between said first and second body end walls and fixedly attached to said body sidewall during fluid-powered operation of the actuator;

a first piston head disposed in said body for axial reciprocating movement, said first piston head being positioned between said bulkhead and said first body end wall and defining a first fluid-tight chamber between said first body end wall and said first piston head and a second fluid-tight chamber between said first piston head and said bulkhead, said first piston head having a central aperture therethrough;

a second piston head disposed in said body for axial reciprocating movement, said second piston head being positioned between said bulkhead and said second body end wall and defining a third fluid-tight chamber between said bulkhead and said second piston head and a fourth fluid-tight chamber between said second piston head and said second body end wall;

connector means for fixedly interconnecting said first and second piston heads together against axial and rotational movement relative to each other such that said first and second piston heads form a piston assembly for reciprocating movement within said body in unison;

an axially extending, rotatable shaft positioned within said body and supported for rotation relative to said body, said shaft extending through said first piston head aperture;

first torque-transmitting means for transmitting torque between said piston assembly and said body and being distributed through said bulkhead in response to reciprocating movement of said piston assembly;

second torque-transmitting means for transmitting torque between said piston assembly and said shaft in response to reciprocating movement of said piston assembly; and seal means for preventing fluid leakage between said first, second, third and fourth fluid-tight chambers.

26. The actuator of claim 25 wherein said connector means is an axially extending sleeve generally coaxially disposed in said body and projecting through a central bulkhead aperture, said sleeve having a central sleeve aperture through which said shaft extends, said sleeve being fixed to said first and second piston heads and extending therebetween for reciprocating movement with said first and second piston heads.

27. The actuator of claim 26 wherein said sleeve has a smooth outer circumferential sidewall portion, and said seal means includes a seal positioned to seal between said smooth sleeve sidewall portion and said bulkhead at said bulkhead central aperture.

28. The actuator of claim 25 wherein said first torque-transmitting means includes a plurality of axially extending guide rods fixedly attached to and extending between said first and second piston heads for reciprocating movement with said first and second piston heads, and a plurality of circumferentially distributed apertures in said bulkhead which each slidably receive one of said guide rods.

29. The actuator of claim 28 wherein said guide rods each have a smooth outer circumferential sidewall portion, and said seal means includes a plurality of seals, each said seal being positioned to seal between one of said guide rod sidewall portions and said bulkhead at one of said circumferentially distributed bulkhead apertures.

30. The actuator of claim 28 wherein said connector means is an axially extending sleeve generally coaxially disposed in said body and projecting through a central bulkhead aperture, said sleeve having a central sleeve aperture through which said shaft extends, said sleeve being fixed to said first and second piston heads and extending therebetween for reciprocating movement with said first and second piston heads.

31. The actuator of claim 30 wherein said sleeve has a smooth outer circumferential sidewall portion, and said seal means includes a seal positioned to seal between said smooth sleeve sidewall portion and said bulkhead at said bulkhead central aperture.

32. The actuator of claim 25 wherein said first torque-transmitting means includes a plurality of axially extending guide rods fixedly attached to and extending between said bulkhead and said first body end wall, and a plurality of circumferentially distributed apertures in said first piston head which each slidably receive one of said guide rods.

33. The actuator of claim 32 wherein said guide rods each have a smooth outer circumferential sidewall portion, and said seal means includes a plurality of seals, each said seal being positioned to seal between one of said guide rod smooth sidewall portions and said first piston head at one of said circumferentially distributed piston head apertures.

34. The actuator of claim 32 wherein said connector means is an axially extending sleeve generally coaxially disposed in said body and projecting through a central bulkhead aperture, said sleeve having a central sleeve aperture through which said shaft extends, said sleeve being fixed to said first and second piston heads and extending therebetween for reciprocating movement with said first and second piston heads.

35. The actuator of claim 34 wherein said sleeve has a smooth outer circumferential sidewall portion, and said seal means includes a seal positioned to seal between said smooth sleeve sidewall portion and said bulkhead at said bulkhead central aperture.

36. A fluid-powered actuator comprising:

a body having first and second axially spaced-apart end walls, and a circumferential body sidewall;

an axially transverse bulkhead positioned between said first and second body end walls and selectively adjustably rotatable to angularly position said bulkhead in a desired stationary position relative to said body for fluid-powered operation of the actuator, said bulkhead having a central non-circular aperture therethrough;

means for seletively fixing said bulkhead in a selected angular position to hold said bulkhead stationary with respect to said body during fluid-powered operation of the actuator, and for selectively releasing said bulkhead to permit adjustable rotation of said bulkhead with respect to the body;

a first piston head disposed in said body for axial reciprocating movement, said first piston head being positioned between said bulkhead and said first body end wall and defining a first fluid-tight chamber between said first body end wall and said first piston head and a second fluid-tight chamber between said first piston head and said bulkhead, said first piston head having a central aperture therethrough;

a second piston head disposed in said body for axial reciprocating movement, said second piston head being positioned between said bulkhead and said second body end wall and defining a third fluid-tight chamber between said bulkhead and said second piston head and a fourth fluid-tight chamber between said second piston head and said second body end wall;

an axially extending sleeve generally coaxially disposed in said body and fixedly interconnecting said first and second piston heads together against axial and rotational movement relative to each other such that said first and second piston heads form a piston assembly for reciprocating movement within said body in unison, said sleeve having a non-circular cross-section corresponding in shape and size to the non-circular shape and size of said bulkhead aperture and slidably projecting through said bulkhead aperture to transmit torque between said piston assembly and said bulkhead in response to reciprocating axial movement of said piston assembly, said sleeve having a central aperture;

an axially extending, rotatable shaft positioned within said body and supported for rotation relative to said body, said shaft extending through said first piston head aperture and said sleeve central aperture;

torque-transmitting means for transmitting torque between said sleeve and said shaft in response to reciprocating movement of said piston assembly; and seal means for preventing fluid leakage fluid between said first, second, third and fourth fluid-tight chambers.

37. The actuator of claim 36 wherein said sleeve has a smooth outer circumferential sidewall portion, and said seal means includes a seal positioned to seal between said smooth sleeve sidewall portion and said bulkhead at said bulkhead central aperture.

38. A fluid-powered actuator comprising:

a body having first and second axially spaced-apart end walls, and a circumferential body sidewall;

an axially transverse bulkhead positioned between said first and second body end walls and fixedly attached to said body sidewall during fluid-powered operation of the actuator;

a first piston head disposed in said body for axial reciprocating movement, said first piston head being positioned between said bulkhead and said first body end wall and defining a first fluid-tight chamber between said first body end wall and said first piston head and a second fluid-tight chamber between said first piston head and said bulkhead, said first piston head having a central aperture therethrough;

a second piston head disposed in said body for axial reciprocating movement, said second piston head being positioned between said bulkhead and said second body end wall and defining a third fluid-tight chamber between said bulkhead and said second piston head and a fourth fluid-tight chamber between said second piston head and said second body end wall;

connector means for fixedly interconnecting said first and second piston heads together against axial and rotational movement relative to each other such that said first and second piston heads form a piston assembly for reciprocating movement within said body in unison, and for transmitting torque between said piston assembly and said body and being distributed through said bulkhead in response to reciprocating movement of said piston assembly;

an axially extending, rotatable shaft positioned within said body and supported for rotation relative to said body, said shaft extending through said first piston head aperture; and torque-transmitting means for transmitting torque between said piston assembly and said shaft in response to reciprocating movement of said piston assembly.

39. The actuator of claim 38 wherein said torque-transmitting means includes at least one groove extending over a first lengthwise portion of said shaft and said shaft has a second lengthwise portion with a smooth, outer circumferential sidewall having a smoothly contoured cross-section, and wherein said interconnecting means includes a sleeve through which said shaft extends, said sleeve including a first sleeve portion positioned adjacent to said grooved first shaft portion and supporting groove engagement means, comprising part of said torque-transmitting means, for engaging said shaft groove to transmit torque between said sleeve and said shaft, and a second sleeve portion which is axially spaced away from said first sleeve portion and positioned adjacent to said smooth second shaft portion to axially slide over said smooth second shaft portion as said first and second piston heads reciprocate during fluid-powered operation of the actuator, said first sleeve portion being connected to said first piston head at an aperture in said first piston head through which said shaft extends and said second sleeve portion being connected to said second piston head at an aperture in said second piston head through which said shaft extends, the actuator further including a seal disposed between said second sleeve portion and said smooth second shaft portion to provide a fluid-tight seal therebetween as said second sleeve portion axially slides over said smooth second shaft portion.

* * * * *

UNITED STATES PATENT AND TRADEMARK OFFICE

CERTIFICATE OF CORRECTION

PATENT NO. : 4,882,979

DATED : November 28, 1989

INVENTOR(S) : Paul P. Weyer

It is certified that error appears in the above-identified patent and that said Letters Patent is hereby corrected as shown below:

On the cover page, delete the title of "DUAL-PISTON ACUATOR" and substitute therefor --DUAL-PISTON ACTUATOR--.

In claim 36, column 18, line 63, delete "seletively" and substitute therefor --selectively--.

Signed and Sealed this

Twentieth Day of November, 1990

*Attest:*

HARRY F. MANBECK, JR.

*Attesting Officer*

*Commissioner of Patents and Trademarks*